United States Patent
Deguchi

(10) Patent No.: US 11,733,943 B2
(45) Date of Patent: Aug. 22, 2023

(54) INFORMATION PROCESSING SYSTEM FOR REDUCING TIME AND EFFORT REQUIRED TO INPUT AUTHENTICATION INFORMATION WHEN USING MULTIPLE DEVICES

(71) Applicant: FUJIFILM BUSINESS INNOVATION CORP., Tokyo (JP)

(72) Inventor: Takuya Deguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 463 days.

(21) Appl. No.: 16/837,103

(22) Filed: Apr. 1, 2020

(65) Prior Publication Data

US 2021/0149610 A1    May 20, 2021

(30) Foreign Application Priority Data

Nov. 15, 2019   (JP) ................. 2019-206883

(51) Int. Cl.
*G06F 3/12*    (2006.01)
*H04N 1/00*    (2006.01)

(52) U.S. Cl.
CPC .......... *G06F 3/1238* (2013.01); *G06F 3/1222* (2013.01); *H04N 1/0048* (2013.01)

(58) Field of Classification Search
CPC .................................... G06F 3/1238
USPC ....................................... 358/1.14
See application file for complete search history.

(56) References Cited

U.S. PATENT DOCUMENTS 11,281,411 B2 *   3/2022   Saigusa .............. G06F 3/1238
2010/0110485 A1 *  5/2010   Watariuchi ......... H04N 1/00244
                                                       358/1.15

FOREIGN PATENT DOCUMENTS

JP    2016-153985 A    8/2016
JP    6381746 B2       8/2018

OTHER PUBLICATIONS

Jun. 27, 2023 Office Action issued in Japanese Patent Application No. 2019-206883.

* cited by examiner

*Primary Examiner* — Jacky X Zheng
(74) *Attorney, Agent, or Firm* — Oliff PLC

(57) ABSTRACT

An information processing system includes a first apparatus, multiple second apparatuses, and a server. The first apparatus receives authentication information from a user and transmits the authentication information to the server. If the user has been authenticated in accordance with the authentication information, the server transmits, to the first apparatus, permission information that indicates two or more second apparatuses that the user is permitted to use from among the second apparatuses. The first apparatus stores the authentication information while transmitting the authentication information to the second apparatuses. If the authentication information indicates one of the second apparatuses, the one of the second apparatuses performs an operation related to use of the one of the second apparatuses.

19 Claims, 10 Drawing Sheets

| USER | AUTHENTICATION INFORMATION | | AVAILABILITY INFORMATION | | | |
|---|---|---|---|---|---|---|
| | USER ID | PASSWORD | ID01 | ID02 | ID03 | ... |
| USER A | U001 | XXXX | AVAILABLE | UNAVAILABLE | AVAILABLE | ... |
| USER B | U002 | XXXX | AVAILABLE | AVAILABLE | AVAILABLE | ... |
| USER C | U003 | XXXX | UNAVAILABLE | AVAILABLE | AVAILABLE | ... |
| ... | ... | ... | ... | ... | ... | ... |

FIG. 10A

| USER | AUTHENTICATION INFORMATION | AVAILABILITY INFORMATION | | | ... |
| --- | --- | --- | --- | --- | --- |
| | | ID01 | | | |
| | | FUNCTION 1 | FUNCTION 2 | FUNCTION 3 | ... |
| USER A | ... | AVAILABLE | AVAILABLE | AVAILABLE | ... |
| USER B | ... | AVAILABLE | AVAILABLE | UNAVAILABLE | ... |
| USER C | ... | UNAVAILABLE | UNAVAILABLE | UNAVAILABLE | ... |
| ... | ... | ... | ... | ... | ... |

FIG. 10B

| USER | AUTHENTICATION INFORMATION | AVAILABILITY INFORMATION | | | ... |
| --- | --- | --- | --- | --- | --- |
| | | ID01 | | | |
| | | WEEKDAY DAYTIME | WEEKDAY NIGHTTIME | HOLIDAYS | ... |
| USER A | ... | AVAILABLE | AVAILABLE | AVAILABLE | ... |
| USER B | ... | AVAILABLE | AVAILABLE | UNAVAILABLE | ... |
| USER C | ... | UNAVAILABLE | AVAILABLE | AVAILABLE | ... |
| ... | ... | ... | ... | ... | ... |

FIG. 11

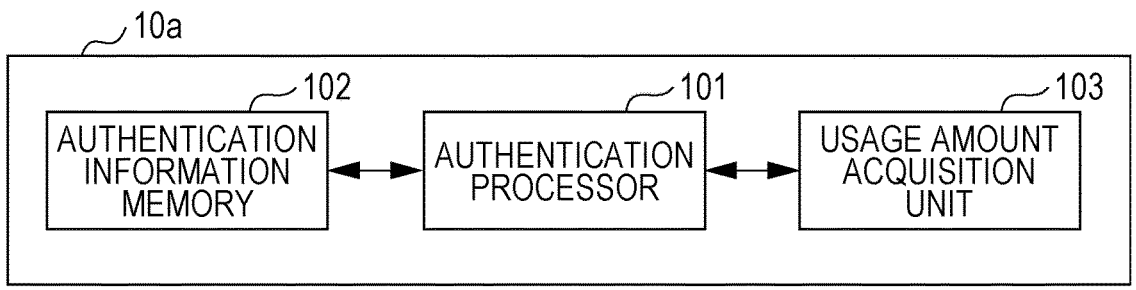

| USAGE AMOUNT | RESTRICTION RANGE |
|---|---|
| LESS THAN Th1 | SETTINGS 1, 2, AND 3 |
| Th1 OR MORE AND LESS THAN Th2 | SETTINGS 1, 2 |
| MORE THAN Th2 | SETTING 1 |

| USAGE AMOUNT | RESTRICTION RANGE |
|---|---|
| LESS THAN Th1 | FUNCTIONS 1, 2, AND 3 |
| Th1 OR MORE AND LESS THAN Th2 | FUNCTIONS 1, 2 |
| MORE THAN Th2 | FUNCTION 1 |

FIG. 15
| USAGE CONDITIONS | PROCESSING CRITERIA |
|---|---|
| COLOR MODE | REMAINING AMOUNT OF COLOR TONER BEING EQUAL TO OR ABOVE REFERENCE VALUE |
| PRINTING FOR SPECIAL PAPER | MANUAL INSERT TRAY INSTALLED |
| DOCUMENT DIGITIZATION | OCR PROGRAM INSTALLED |
FIG. 16
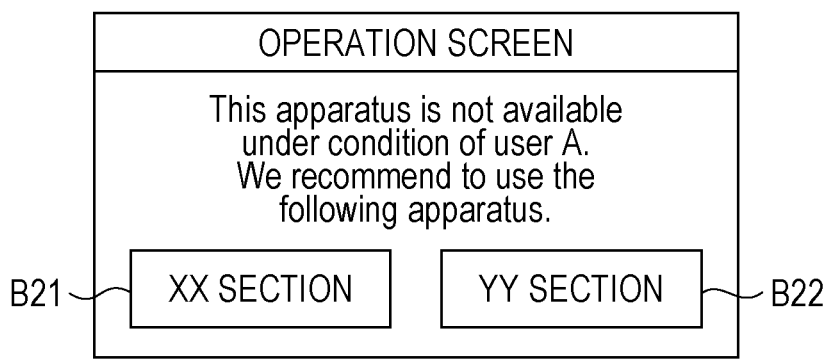
FIG. 17
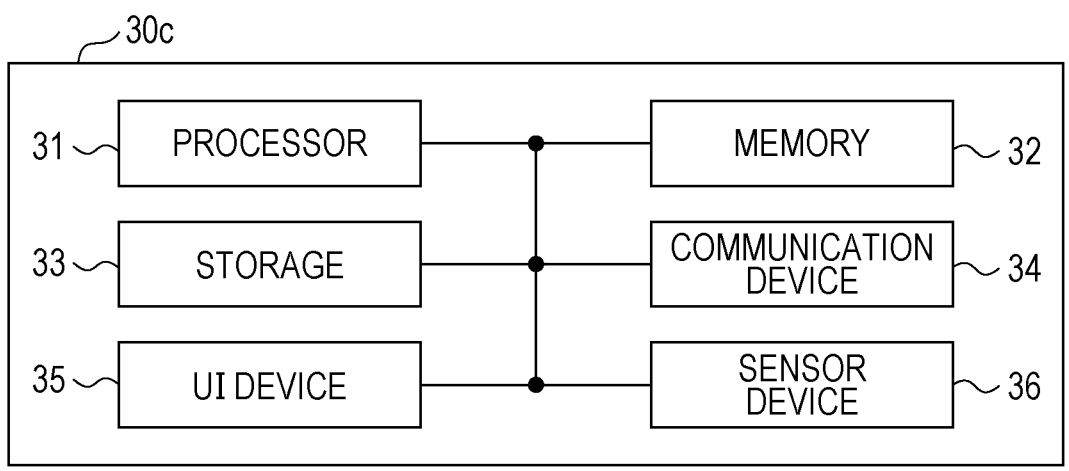

FIG. 18

| USER | AUTHENTICATION INFORMATION | | AVAILABILITY INFORMATION | | | VALIDITY PERIOD |
|---|---|---|---|---|---|---|
| | USER ID | PASSWORD | ID01 | ID02 | ID03 | |
| USER A | U001 | XXXX | AVAILABLE | UNAVAILABLE | AVAILABLE | WITHIN 1 WEEK |
| USER B | U002 | XXXX | AVAILABLE | AVAILABLE | AVAILABLE | WITHIN 2 WEEKS |
| USER C | U003 | XXXX | UNAVAILABLE | AVAILABLE | AVAILABLE | WITHIN 3 DAYS |
| ... | ... | ... | ... | ... | ... | ... |

FIG. 19

| AMOUNT OF TRANSMISSION | COEFFICIENT |
|---|---|
| LESS THAN Th11 | 1.0 TIMES |
| Th11 OR MORE AND LESS THAN Th12 | 1.5 TIMES |
| MORE THAN Th12 | 2.0 TIMES |

INFORMATION PROCESSING SYSTEM FOR REDUCING TIME AND EFFORT REQUIRED TO INPUT AUTHENTICATION INFORMATION WHEN USING MULTIPLE DEVICES

CROSS-REFERENCE TO RELATED APPLICATIONS

This application is based on and claims priority under 35 USC 119 from Japanese Patent Application No. 2019-206883 filed Nov. 15, 2019.

BACKGROUND

(i) Technical Field

The present disclosure relates to an information processing system.

(ii) Related Art

Japanese Patent No. 6381746 discloses a technique of outputting image data on an image output device. The image output device displays a readable code pattern including permission information and permitting a user, not authorized to use the image output device, to temporarily use the image output device. If the code pattern read by an information processing apparatus includes the permission information, the image data is displayed on the image output unit.

When, as disclosed in Japanese Patent No. 6381746, the user is authenticated to determine whether the user is permitted to use the device, authentication information, such as a user identification (ID) and password, may be input. If inputting the authentication information is performed each time the data output device is used, it may be time consuming.

SUMMARY

Aspects of non-limiting embodiments of the present disclosure relate to reducing user time more to input authentication information on two or more apparatuses than when the authentication information is input on a per apparatus basis.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system. The information processing system includes a first apparatus, multiple second apparatuses, and a server. The first apparatus receives authentication information from a user and transmits the authentication information to the server. If the user has been authenticated in accordance with the authentication information, the server transmits, to the first apparatus, permission information that indicates two or more second apparatuses that the user is permitted to use from among the second apparatuses. The first apparatus stores the authentication information while transmitting the authentication information to the second apparatuses. If the authentication information indicates one of the second apparatuses, the one of the second apparatuses performs an operation related to use of the one of the second apparatuses.

BRIEF DESCRIPTION OF THE DRAWINGS

Exemplary embodiment of the present disclosure will be described in detail based on the following figures, wherein:

FIGS. 10A and 10B illustrate an example of the availability information of a modification of the exemplary embodiment;
FIG. 11 illustrates a functional block diagram implemented by the modification;
FIG. 15 illustrates an example of a process criteria table;
FIG. 16 illustrates an example of output recommendation information;
FIG. 17 illustrates a hardware configuration of the modification;
FIG. 18 illustrates an example of a stored validity period;
and
FIG. 19 illustrates an example of a coefficient table.

DETAILED DESCRIPTION

Exemplary Embodiment

Figure 1:
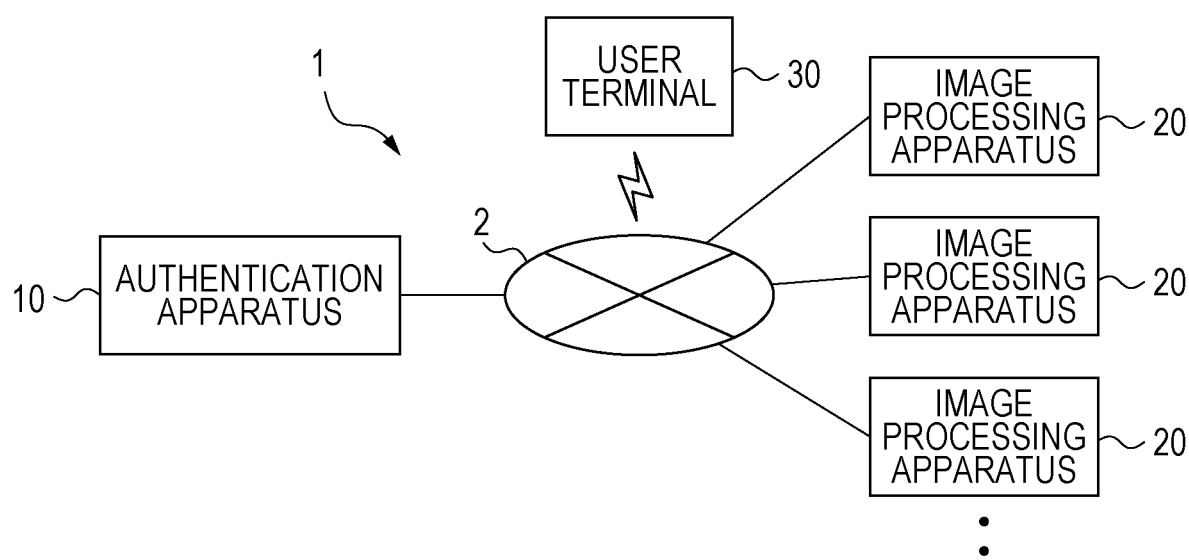
FIG. 1 illustrates a whole authentication assisting system of an exemplary embodiment.

FIG. 1 illustrates the whole configuration of an authentication assisting system 1 of an exemplary embodiment. The authentication assisting system 1 includes a communication network 2, authentication apparatus 10, multiple image processing apparatuses 20, and user terminal 30. The authentication assisting system 1 permits a user who likes to use the image processing apparatus 20 to use the image processing apparatus 20, in other words, the authentication assisting system 1 assists an authentication process.

The communication system 2 includes a mobile communication network and the Internet and relays data that the authentication assisting system 1 exchanges with other apparatuses (including terminals and systems). The communication system 2 is wired linked to the authentication apparatus 10 and the image processing apparatus 20 and is wirelessly linked with the user terminal 30. Communication configuration between each apparatus and the communication system 2 is not limited to the communication configuration in FIG. 1 and may be wired or wireless communication configuration.

The image processing apparatus 20 provides a user with a service, such as printing, copying, scanning, and/or faxing of image data (hereinafter referred to as "image processing service"). The image processing apparatus 20 is used by a user who is permitted to use the image processing apparatus 20, namely, an authenticated user. In the authentication assisting system 1, authentication information of the user who is permitted to use the image processing apparatus 20 is registered in the authentication apparatus 10.

The authentication information is used in authentication and may be a user identification (ID) and password. The authentication information may be biological information, such as fingerprint information, palm print information, or glow information. The user terminal 30 is a mobile terminal carried by a user and, for example, may be a smart phone. The user terminal 30 receives the authentication information from the user and transmits the input authentication information to the authentication apparatus 10.

The authentication apparatus 10 performs an authentication process for the image processing apparatus 20. If the authentication information transmitted from the user terminal 30 matches the authentication information registered on the authentication apparatus 10, the authentication apparatus 10 permits the user whose authentication information is registered to use the image processing apparatus 20, namely, authenticates the user. Operations of each apparatus subsequent to the authentication process is described in detail below. The authentication apparatus 10 is an example of a server in the disclosure. The user terminal 30 is an example of a first apparatus in the disclosure. The image processing apparatus 20 is an example of a second apparatus in the disclosure.

Figure 2:
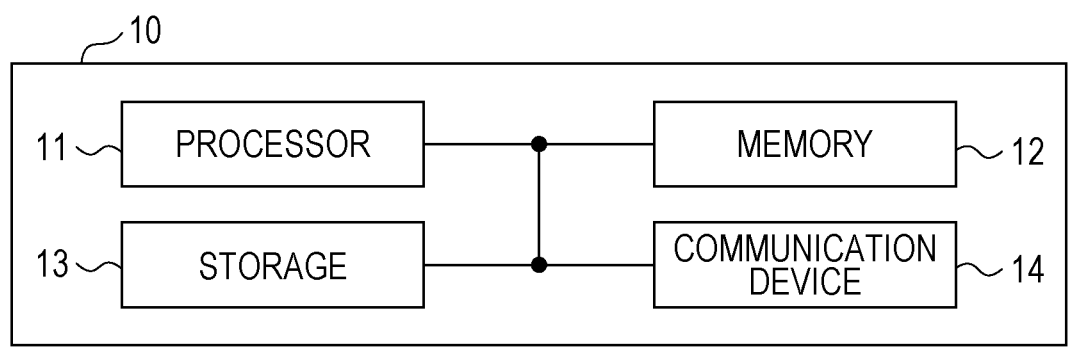
FIG. 2 illustrates a hardware configuration of an authentication apparatus.

FIG. 2 illustrates the hardware configuration of the authentication apparatus 10. The authentication apparatus 10 is a computer and includes a processor 11, memory 12, storage 13, and communication device 14. The processor 11 includes an arithmetic unit, such as a central processing unit (CPU), register, and peripheral circuit. The memory 12 is a recording medium readable by the processor 11 and includes a random-access memory (RAM) and read-only memory (ROM).

The storage 13 is a recording medium readable by the processor 11 and, for example, includes a hard disk drive or a flash memory. The processor 11 controls the operation of each hardware element by using the RAM as a working area and by executing a program stored on the ROM or the storage 13. The communication device 14 is a communication medium performing communication via the communication network 2 and includes an antenna and a communication circuit.

Figure 3:
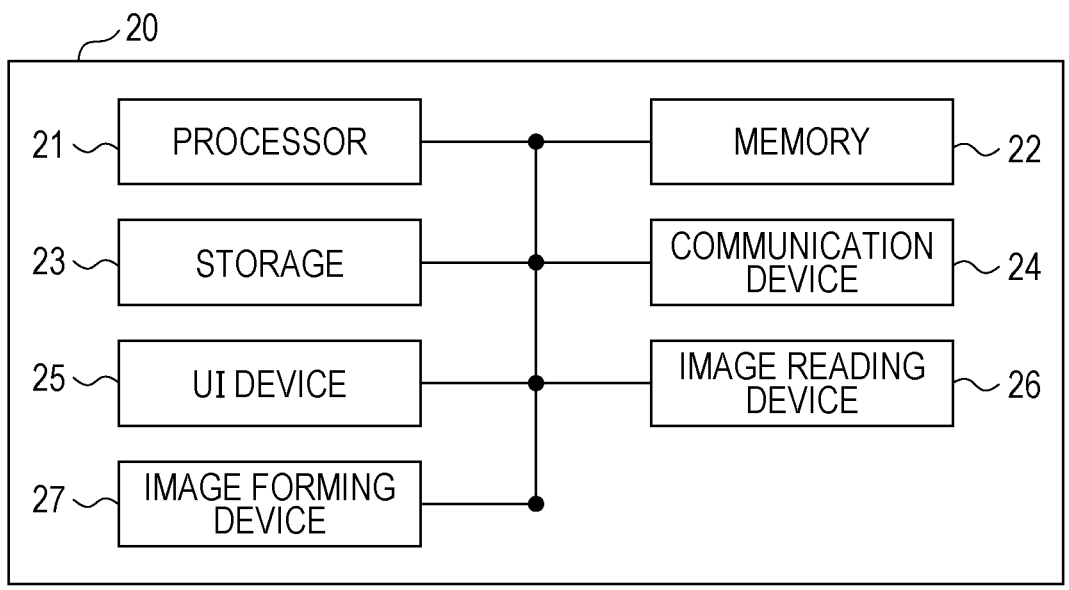
FIG. 3 illustrates a hardware configuration of an image processing apparatus.

FIG. 3 illustrates the hardware configuration of the image processing apparatus 20. The image processing apparatus 20 is a computer and includes a processor 21, memory 22, storage 23, communication device 24, user interface (UI) device 25, image reading device 26, and image forming device 27. The processor 21, memory 22, storage 23, and communication device 24 are respectively identical to the processor 11, memory 12, storage 13, and communication device 14 in FIG. 2 in terms of hardware point of view. The communication device 24 performs communications through the communication system 2 and also performs peer to peer (P2P) communications with another apparatus in accordance with near field communication standards, such as Near Field Communication (NFC).

The UI device 25 is an interface provided to a user who uses the image processing apparatus 20. For example, the UI device 25 includes a display and a touch screen having a touch panel arranged on the top face of the display. The UI device 25 displays a screen while receiving an operation from the user. The UI device 25 also includes an operator, such as a keyboard, in addition to the touch screen and receives an operation performed on the operator.

The image reading device 26 is a hardware element (for example, a scanner) reading an image on a medium, such as a paper sheet, and is an image reading unit that reads an image from the medium set thereon. The image forming device 27 is a printer forming an image on a medium, such as a paper sheet and is thus an image forming unit. The image forming device 27 transfers and fixes an image to a medium in an electrophotographic system while transporting the medium set thereon and thus forms the image on the medium.

Figure 4:
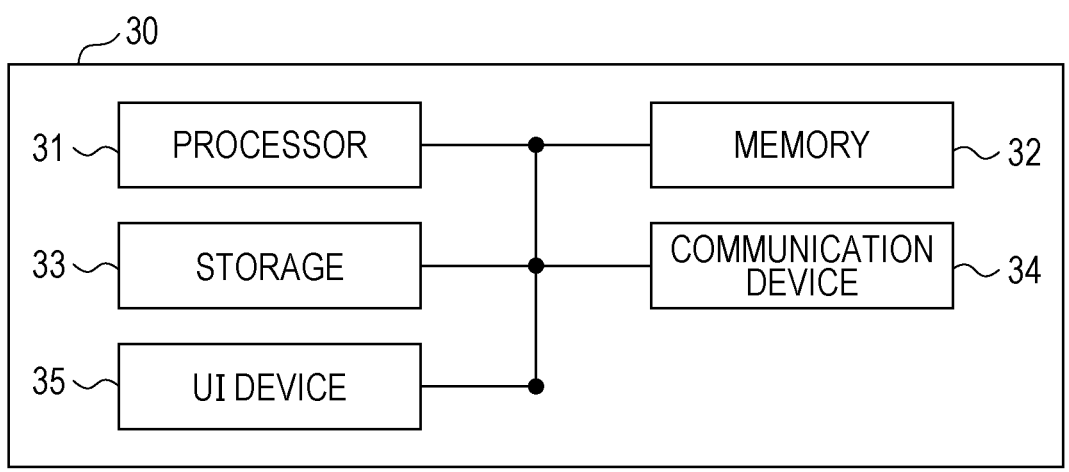
FIG. 4 illustrates a hardware configuration of a user terminal.

FIG. 4 illustrates the hardware configuration of the user terminal 30. The user terminal 30 is a computer and includes a processor 31, memory 32, storage 33, communication device 34, UI device 35. The processor 31, memory 32, storage 33, communication device 34, and UI device 35 are respectively identical to the processor 21, memory 22, storage 23, communication device 24, and UI device 25 in FIG. 3 in terms of hardware point of view. Like the communication device 24, the communication device 34 performs not only communications through the communication system 2 but also the P2P communication through the communication system 2.

In the authentication assisting system 1, the processor of each apparatus executes the program of the apparatus and thus performs functions described below. The operation of each function is described as the operation performed by the processor of the apparatus implementing the function.

Figures 5, 6:
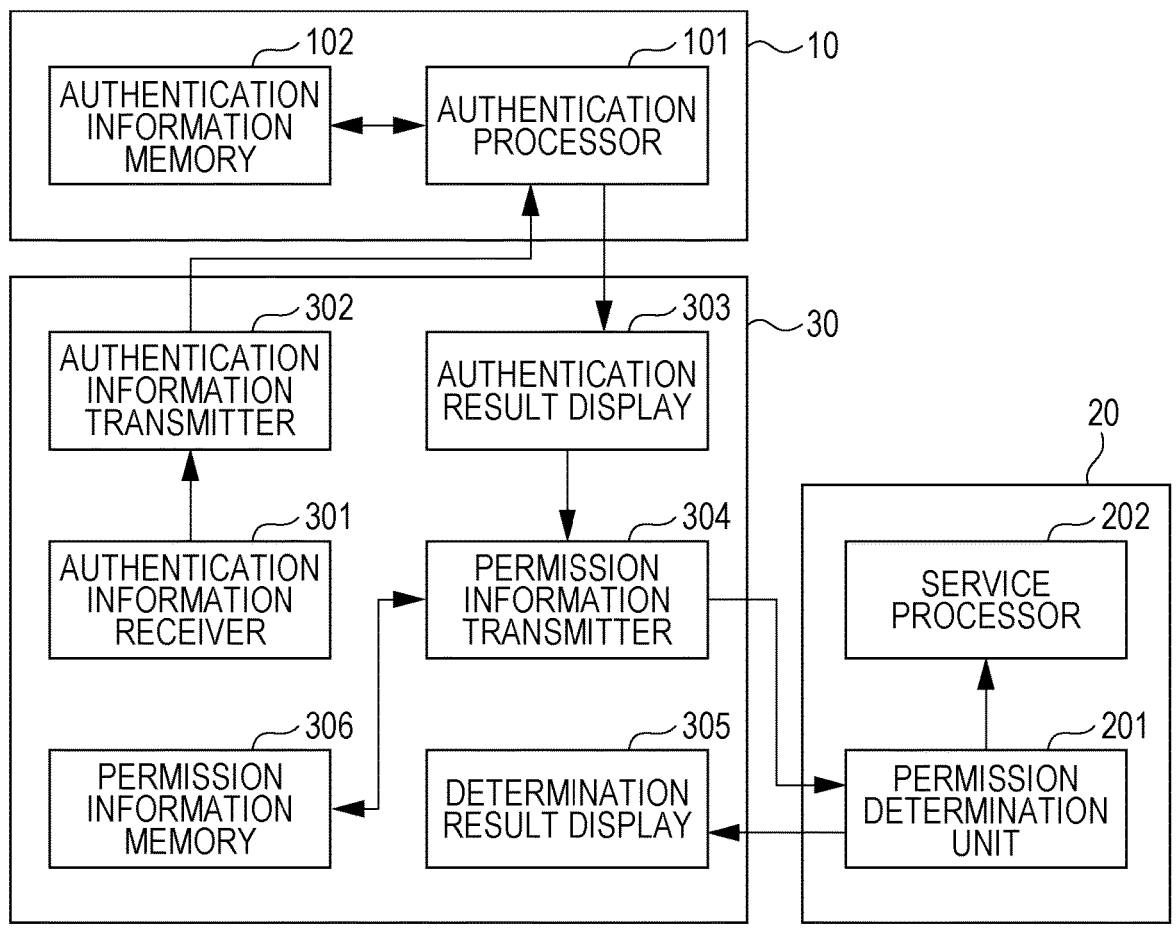
FIG. 5 illustrates a functional configuration implemented by the authentication assisting system.
FIG. 6 illustrates an example of authentication information and availability information.

FIG. 5 illustrates a functional block diagram of the authentication assisting system 1. The authentication apparatus 10 includes an authentication processor 101 and authentication information memory 102. The image processing apparatus 20 includes a permission determination unit 201 and service processor 202. The user terminal 30 includes an authentication information receiver 301, authentication information transmitter 302, authentication result display 303, permission information transmitter 304, determination result display 305, and permission information memory 306.

The authentication information receiver 301 in the user terminal 30 receives the authentication information of a user. In accordance with the exemplary embodiment, the authentication information receiver 301 causes a display (such as a touch screen) thereof to display an input screen for user identification (ID) and password and receives the input user ID and password as the authentication information. The authentication information receiver 301 transfers the received authentication information to the authentication information transmitter 302.

The authentication information transmitter 302 transmits to the authentication apparatus 10 the authentication information of the user received by the authentication information receiver 301. The authentication processor 101 in the authentication apparatus 10 performs an authentication operation in accordance with the authentication information transmitted from the user terminal 30. The authentication processor 101 performs the authentication operation by referencing the authentication information memory 102. The authentication information memory 102 stores the authentication information of the user who has been permitted to use the image processing apparatus 20.

Referring to FIG. 1, the authentication assisting system 1 includes multiple image processing apparatuses 20. In the authentication assisting system 1, among the image processing apparatuses 20, a target image processing apparatus that is available to users may be different from user to user. The authentication information memory 102 stores the authentication information of the user who is permitted to use at least one image processing apparatus 20. The authentication information memory 102 stores, together with the authentication information, availability information indicating the availability (use permission) of each image processing apparatus 20.

FIG. 6 illustrates an example of the authentication information and availability information. Referring to FIG. 6, the authentication information memory 102 stores the user IDs and passwords of users A, B, and C as the authentication information. The authentication information memory 102 also stores, as the availability information of users, character strings "available" and "unavailable" corresponding to apparatus IDs, such as "ID01", "ID02", and "ID03". For example, the user A is permitted to use "ID01" and "ID03" but not permitted to use "ID02".

The user B is permitted to use "ID01", "ID02", and "ID03". The user C is permitted to use "ID02" and "ID03" but not permitted to use "ID01". The authentication information memory 102 stores the authentication information and availability information registered by the administrator, operator, or user of the authentication assisting system 1. The availability of the image processing apparatus 20 to each user may be determined in view of the cost allocation of departments, confidential information protection, and convenience.

Referring to FIG. 6, the authentication information memory 102 stores the availability information that indicates each user permitted to use two or more image processing apparatuses 20. Upon receiving the authentication information from the user terminal 30, the authentication processor 101 references the authentication information memory 102 and determines whether the authentication information memory 102 stores the authentication information matching the received authentication information. If the authentication information memory 102 does not store the matched authentication information, the authentication processor 101 generates authentication result data about authentication results indicating that the user has not been authenticated and then transmits the authentication result data to the user terminal 30.

If the matched authentication information is stored on the authentication information memory 102, the authentication processor 101 generates authentication result data about authentication results indicating that the user has been authenticated and about permission information indicating two or more image processing apparatuses 20 that the user is permitted to use. The authentication processor 101 then transmits the authentication result data to the user terminal 30. The permission information indicates two or more image processing apparatuses 20 that are in an available status in the availability information.

Figure 7A:
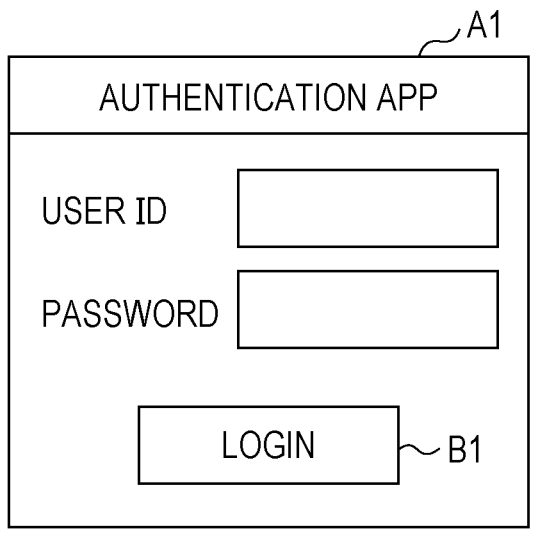
FIGS. 7A through 7E illustrate an example of transitions of a display on the user terminal.

The authentication result display 303 in the user terminal 30 displays on the display of the user terminal 30 the authentication results indicated by the received authentication result data and the permission information. The transition of the display of the user terminal 30 is described with reference to FIGS. 7A through 7E. FIGS. 7A through 7E illustrate the transitions of the display of the user terminal 30. FIG. 7A illustrates a reception screen A1 of the authentication information displayed by the authentication information receiver 301.

The reception screen A1 includes input boxes for the user ID and password, and a login button B1. The user may enter the user ID and password and then press the login button B1. As previously described, the authentication information receiver 301 receives as the authentication information the user ID and password input and the authentication information transmitter 302 transmits the authentication information to the authentication apparatus 10.

Figure 7B:
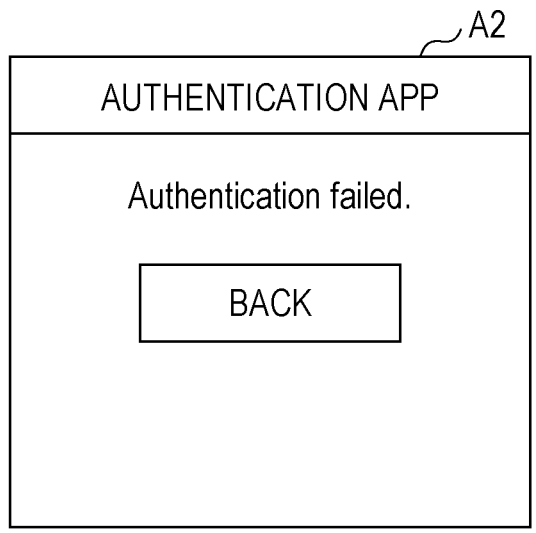

If the authentication has been unsuccessful through the transmitted authentication information, the authentication processor 101 transmits the authentication result data indicating a failure screen A2 of the authentication in FIG. 7B. If the authentication has been successful through the transmitted authentication information, the authentication processor 101 transmits the authentication result data indicating a success screen A3 of the authentication in FIG. 7C. Displayed on the success screen A3 are the permission information indicating the available image processing apparatuses 20 (the apparatus IDs "ID01" and "ID03" in the example of FIG. 7C) and a send button B2.

The permission information may be the name of the image processing apparatus 20, installation location of the image processing apparatus 20, and/or section where the image processing apparatus 20 has been installed. The permission information may be desirably information by which the user may identify the image processing apparatus 20. If the send button B2 is pressed, the authentication result display 303 transfers the displayed permission information to the permission information transmitter 304. The permission information transmitter 304 transmits the transferred permission information to the image processing apparatus 20.

When the user terminal 30 is held over the image processing apparatus 20, the permission information transmitter 304 transmits the permission information to the image processing apparatus 20 through the P2P wireless communication complying with NFC. The permission determination unit 201 in the image processing apparatus 20 determines whether the permission information transmitted from the user terminal 30 indicates that the user is permitted to use the image processing apparatus 20. For example, if the permission information indicates the apparatus ID of the image processing apparatus 20, the permission determination unit 201 determines that the permission information indicates the availability of the image processing apparatus 20.

If the permission information does not indicate the apparatus ID of the image processing apparatus 20, the permission determination unit 201 determines that the permission information does not indicate the availability of the image processing apparatus 20. The permission determination unit 201 transmits via the P2P communication to the user terminal 30 determination result data indicating determination results. The determination result display 305 in the user terminal 30 displays on the display of the user terminal 30 the determination results indicated by the transmitted determination result data.

Figure 7C:
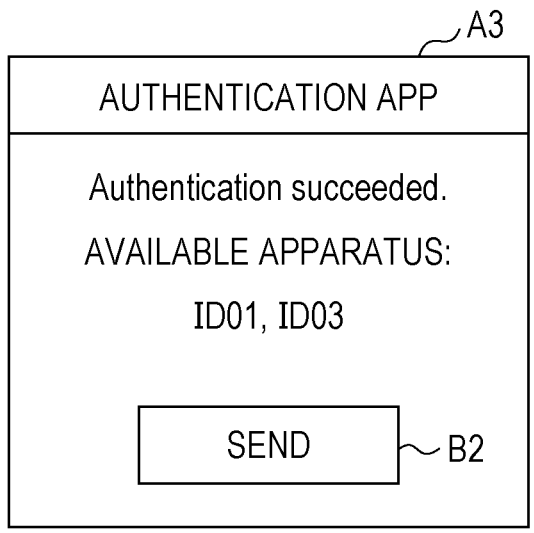
Figure 7D:
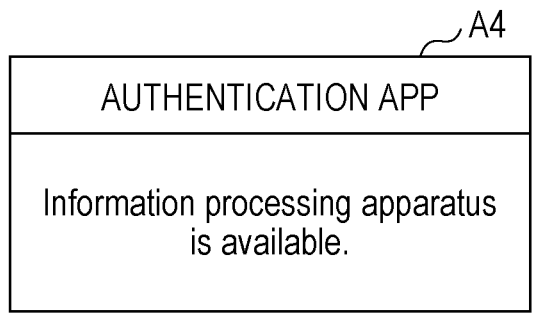
Figure 7E:
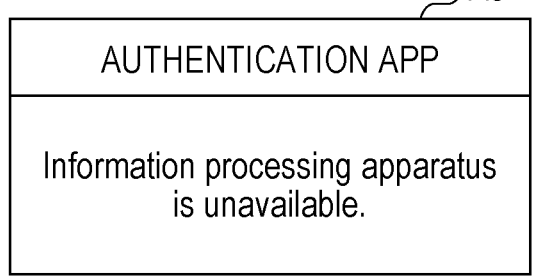

If the determination results are that the permission information indicates the availability of the image processing apparatus 20, the determination result display 305 displays as illustrated in FIG. 7D a determination result screen A4 including character strings indicating that the image processing apparatus 20 is available. If the determination results are that the permission information does not indicate the availability of the image processing apparatus 20, the determination result display 305 displays as illustrated in FIG. 7E a determination result screen A5 including character strings indicating that the image processing apparatus 20 is unavailable.

If the determination results are that the permission information indicates the availability of the image processing apparatus 20, the permission determination unit 201 notifies the service processor 202 of the availability of the image processing apparatus 20. When the service processor 202 has received the notification from the permission determination unit 201, namely, when the permission information transmitted from the user terminal 30 indicates the image processing apparatus 20, the service processor 202 performs an operation related to the use of the image processing apparatus 20 (hereinafter referred to as a "use-related operation").

In accordance with the exemplary embodiment, the service processor 202 performs the use-related operations related to the image processing service (copy operation, print operation, scan operation, and fax operation). When the use-related operation is performed, the determination result screen A4 in FIG. 7D is displayed. The user may use the image processing service by operating the image processing apparatus 20.

The permission information transmitter 304 transfers the permission information, which is also transmitted to the image processing apparatus 20, to the permission information memory 306. The permission information memory 306 stores the transferred permission information, namely, the permission information indicating the image processing apparatus 20 that the authenticated user is permitted to use. The permission information stored on the permission information memory 306 is reused when the user uses another image processing apparatus 20.

Figure 8A:
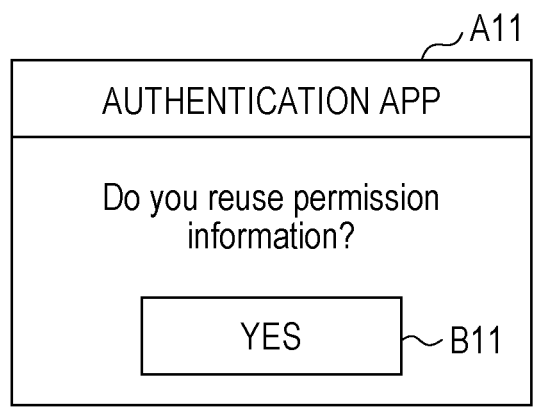
FIGS. 8A and 8B illustrate an example of a screen used to reuse permission information.
Figure 8B:
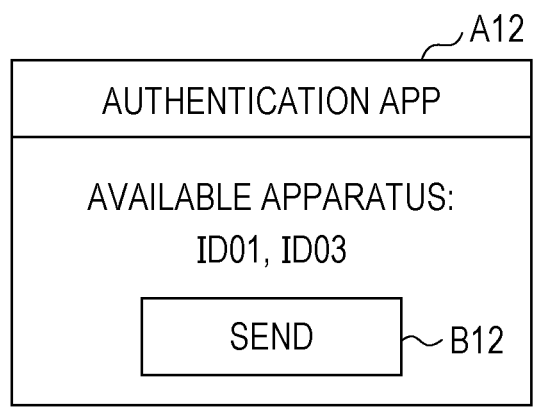

To use another image processing apparatus 20, the user operates the user terminal 30 to display a screen for the reuse of the permission information. FIGS. 8A and 8B illustrate an example of the screen for the reuse of the permission information. For example, referring to FIG. 8A, the permission information transmitter 304 displays on the display of the user terminal 30 a reuse screen A11 including a character string "Do you reuse permission information?" and a yes button B11.

If the user presses the yes button B11, the permission information transmitter 304 reads the stored permission information by referencing the permission information memory 306. The permission information transmitter 304 displays a send screen A12 illustrated in FIG. 8B as the read permission information and including a character string "Available apparatuses: ID01, ID03" and a send button B12. When the user presses the send button B12, the authentication result display 303 transfers the displayed permission information to the permission information transmitter 304.

The permission information transmitter 304 transmits the transferred permission information to the image processing apparatus 20. The permission determination unit 201 performs the determination operation, the determination result display 305 displays the determination results, and the service processor 202 performs the use-related operation if the permission information indicates the availability of the image processing apparatus 20 that is the transmission destination.

Figure 9:
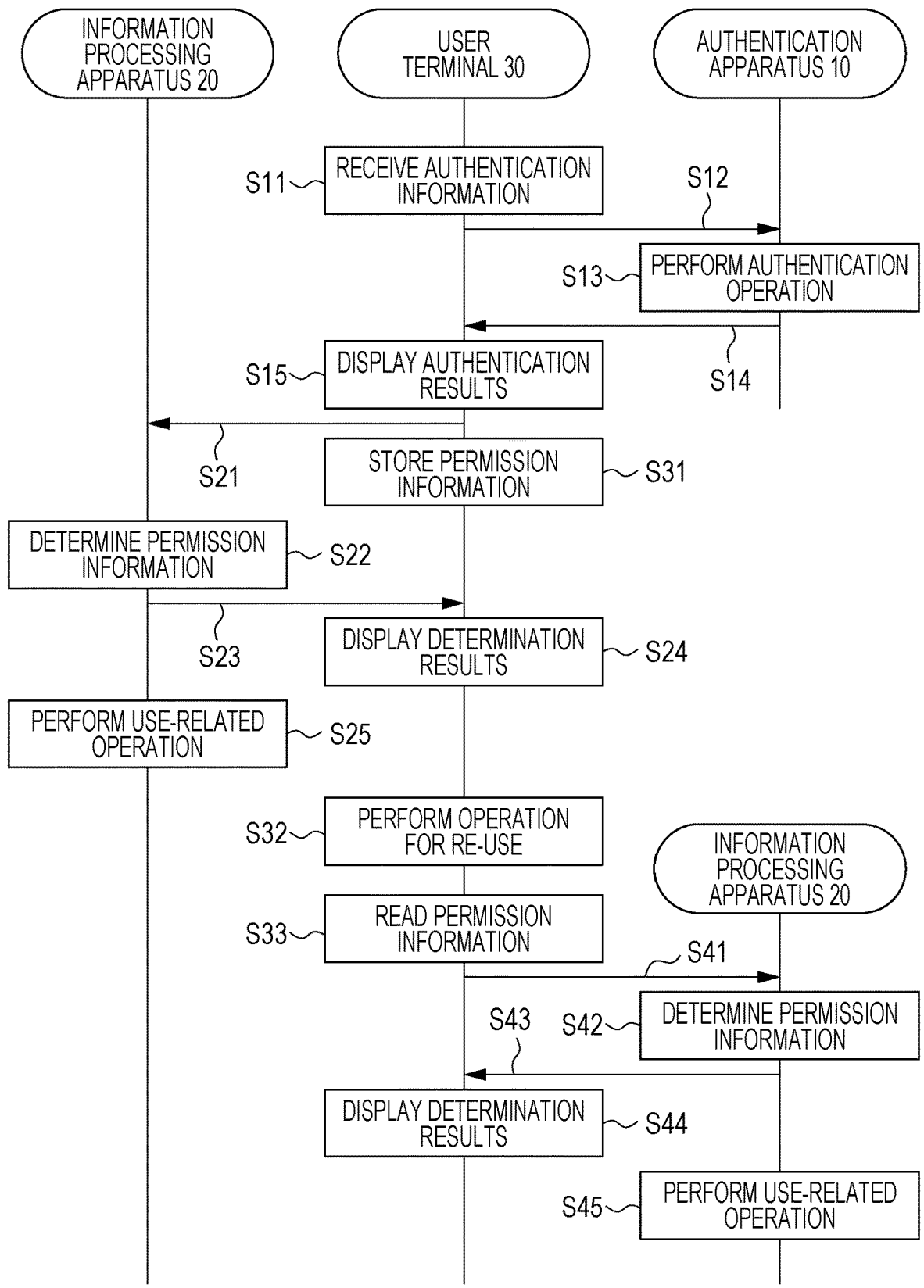
FIG. 9 illustrates an example of an authentication assisting process.

The apparatuses configured described above in the authentication assisting system 1 perform an authentication assisting process to assist the image processing apparatus 20 in the authentication process. FIG. 9 illustrates the authentication assisting process. The user terminal 30 (the authentication information receiver 301) receives the user ID and password input by the user as the authentication information of the user (step S11).

The user terminal 30 (the authentication information transmitter 302) transmits to the authentication apparatus 10 the authentication information of the user received in step S11 (step S12). The authentication apparatus 10 (the authentication processor 101) performs the authentication process in accordance with the received permission information (step S13). Referring to FIG. 9, the user has been successfully authenticated. In such a case, the authentication apparatus 10 (the authentication processor 101) transmits to the user terminal 30 the authentication result data indicating the authentication results and the permission information of the available image processing apparatus 20 (step S14).

The user terminal 30 (the authentication result display 303) causes the display thereof to display the success screen A3 of the authentication in FIG. 7C as the permission information and the authentication results indicated by the received authentication result data (step S15). If the user presses the send button B2 on the success screen A3, the user terminal 30 (the permission information transmitter 304) transmits the displayed permission information to the image processing apparatus 20 (step S21).

The user terminal 30 (the permission information memory 306) stores the permission information, which has also been transmitted to the image processing apparatus 20 (step S31). The image processing apparatus 20 (the permission determination unit 201) determines whether the received permission information indicates the availability of the image processing apparatus 20 (step S22) and transmits the determination result data indicating the determination results to the user terminal 30 (step S23).

The user terminal 30 (the determination result display 305) causes the display thereof to display the determination results indicated by the received determination result data (step S24). Referring to FIG. 9, the permission information indicates the availability of the image processing apparatus 20 serving as the destination of the permission information. In such a case, the determination result screen A4 including the character string indicating the availability of the image processing apparatus 20 illustrated in FIG. 7D is displayed.

The image processing apparatus 20 (the service processor 202) performs the use-related operation in response to a user operation (step S25). The user may now perform an operation to display a screen to reuse the permission information illustrated in FIGS. 8A and 8B in order to use another image processing apparatus 20. In such a case, the user terminal 30 (the permission information transmitter 304) receives the operation for reuse (step S32) and reads the permission information stored on the image processing apparatus 20 (step S33).

The user terminal 30 (the permission information transmitter 304) transmits the read permission information to the image processing apparatus 20 (step S41). Operations in steps S42 through 45 respectively identical to those in steps S22 through 25 are performed by the user terminal 30 and the other image processing apparatus 20. The process in FIG. 9 is thus complete.

In accordance with the exemplary embodiment, once the user enters the permission information to use the image processing apparatus 20, the permission information is reused when another image processing apparatus 20 is used. The user is thus free from entering the permission information again. The permission information indicates two or more image processing apparatuses 20 that the user is permitted to use. Once the permission information for one image processing apparatus 20 is input, the permission information for at least one of the other image processing apparatuses 20 is reused. In accordance with the exemplary embodiment, if two or more image processing apparatuses 20 are used, time consumed to input the permission information is shorter than when the permission information is input on a per apparatus basis.

Modifications

The exemplary embodiment has been described for exemplary purposes only and may be modified as described below. The exemplary embodiment and the modifications may be combined as appropriate.

Usage Conditions

In accordance with the exemplary embodiment, the authentication processor 101 includes the information indicating two or more image processing apparatuses 20 that the user is permitted to use as the permission information in the authentication result data and then transmits the authentication result data to the user terminal 30. Alternatively, information indicating the image processing apparatuses 20 and other factors may be included as the permission information.

The authentication processor 101 transmits to the user terminal 30 information indicating a condition in using two or more available image processing apparatuses 20 as the permission information. The condition in using the image processing apparatuses 20 may be a condition that restricts available functions, available settings, available time period, available venue, and/or available usage amount. In accordance with the exemplary embodiment, the authentication information memory 102 stores the availability information related to the usage condition.

FIGS. 10A and 10B illustrate an example of the availability information of a modification of the exemplary embodiment. Referring to FIGS. 10A and 10B, the authentication information memory 102 stores the availability information for users A, B, and C including the usage condition. Referring to FIG. 10A, available functions of the image processing apparatus 20 having the apparatus ID "ID01" are "function 1", "function 2", and "function 3". The user A is permitted to use the functions 1, 2, and 3, and the user B is permitted to use the functions 1 and 2.

The user C is permitted to use none of these functions. This indicates that the image processing apparatus 20 having the apparatus ID "ID01" is unavailable to the user C. Referring to FIG. 10B, the available time period for the image processing apparatus 20 having the apparatus ID "ID01" is "weekday daytime", "weekday nighttime", and "holidays". The user A is permitted to use during any time period of these. The user B is permitted to use during the weekdays. The user C is permitted to use during the weekday nighttime and the holidays.

The authentication processor 101 transmits the authentication result data to the user terminal 30. The authentication result data includes as the permission information the information, indicating the condition indicating the availability of functions, out of the availability information stored in association with the authenticated user. In this case, the permission information includes the apparatus ID of the available image processing apparatus 20. Referring to FIGS. 10A and 10B, the authentication processor 101 transmits information indicating the condition different from authenticated user to authenticated user.

The permission information transmitter 304 in the user terminal 30 transmits the received permission information to the image processing apparatus 20. If the permission determination unit 201 in the image processing apparatus 20 determines that the received permission information indicates the availability of the image processing apparatus 20, the permission determination unit 201 transfers the permission information to the service processor 202. In accordance with the usage condition indicated by the transferred permission information, the service processor 202 performs the use-related operation.

Referring to FIG. 10A, the service processor 202 performs the use-related operation for each of the functions 1, 2, and 3 for the user A and the use-related operation for only the functions 1 and 2 for the user B. In accordance with the modification, if the authenticated user uses the image processing apparatus 20, the usage is still restricted. Referring to FIGS. 10A and 10B, the usage restriction is determined on a per user basis.

Usage Restriction Range

The usage condition may be set as a usage restriction range of the image processing apparatus 20. The usage restriction ranges may be the range of available function, range of available setting, range of available time period, range of available venue, and/or range of available usage amount. The use of the image processing apparatus 20 beyond these ranges is restricted.

In accordance with the modification, the restriction range is determined depending on the usage amount in the image processing apparatus 20. The usage amount in the image processing apparatus 20 is represented by the number of sheets printed in the use of the copy service or the print service or by the number of document sheets read in the use of the scan service or the fax service. The usage amount may be varied depending on the use of colors, the type of paper sheets, and the quality of images.

FIG. 11 illustrates a functional configuration implemented by the modification. Referring to FIG. 11, an authentication apparatus 10a includes a usage amount acquisition unit 103 in addition to the elements in FIG. 5. The usage amount acquisition unit 103 acquires a usage amount in the image processing apparatus 20. For example, the usage amount acquisition unit 103 acquires the usage amounts in multiple image processing apparatuses 20 on a per user basis. In accordance with the modification, when the service processor 202 in the image processing apparatus 20 performs the use-related operation, the operation log of the use-related operation is transmitted in association with the user ID of the authenticated user to the authentication apparatus 10a.

The usage amount acquisition unit 103 calculates the usage amount from the received operation log and acquires the calculated usage amount as a usage amount of the user having the user ID associated with the operation log. The usage amount acquisition unit 103 stores the acquired usage amount in association with the user ID. When the user is authenticated, the authentication processor 101 references the usage amount stored in association with the user ID of the user.

Figures 12, 13, 14:
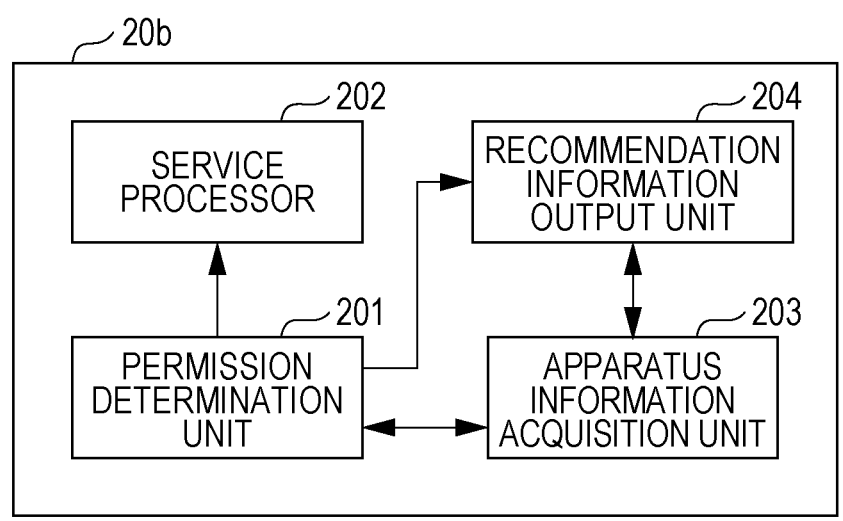
FIG. 12 illustrates an example of a range table.
FIG. 13 illustrates an example of another range table.
FIG. 14 illustrates a functional block diagram implemented by the modification.

The authentication processor 101 transmits to the user terminal 30 the permission information indicating the usage condition determining the restriction range having a width responsive to the usage amount referenced. The authentication processor 101 uses a range table indicating the relationship between the usage amount and the restriction range. FIG. 12 illustrates an example of the range table. Referring to FIG. 12, the usage ranges "Less than Th1", "Th1 or more and less than Th2", and "More than Th2" are respectively associated with restriction ranges "Settings 1, 2, 3", "Settings 1 and 2", and "Setting 1".

The settings 1, 2, and 3 represent available settings. For example, the setting 3 is a color setting, the setting 2 is a high image-quality setting, and the setting 1 is a monochrome setting. Referring to FIG. 12, the authentication processor 101 transmits the permission information having a narrower usage condition for a user consuming a larger usage amount. In such a case, referring to FIG. 12, a user consuming a larger usage amount is difficult in using a higher cost service and costs related to the image processing apparatuses 20 are thus controlled.

The authentication processor 101 may transmit the permission information that indicates a usage condition having a wider available range for a user whose usage amount is larger. In such a case, a user who uses more frequently the image processing apparatus 20 may enjoy a wider available range. Higher convenience results and efficiency of whole business is increased. Since the restriction range varies depending on the usage amount of each user, the user may become conscious of the usage amount. The usage amount of the image processing apparatus 20 is thus properly adjusted.

The example described above uses the usage condition specifying the restriction range having a width responsive to the usage amount of each user, namely, the usage condition specifying the usage restriction range of each user. The disclosure is not limited to this configuration. For example, the usage condition specifying the usage restriction range on each image processing apparatus 20 may be used. In such a case, the usage amount acquisition unit 103 acquires the usage amount of each of the image processing apparatuses 20 in place of the usage amount of each user.

The service processor 202 performs the use-related operation and transmits to the authentication apparatus 10a the operation log of the use-related operation in association with the apparatus ID of the image processing apparatus 20. The usage amount acquisition unit 103 calculates the usage amount from the received operation log and acquires the calculated usage amount as the usage amount of the image processing apparatus 20 having the apparatus ID associated with the operation log. The usage amount acquisition unit 103 stores the acquired usage amount in association with the apparatus ID.

In accordance with the modification, the authentication information receiver 301 in the user terminal 30 acquires not only the apparatus ID of the image processing apparatus 20 but also the authentication information of the user. Through the P2P communication triggered when the user terminal 30 is held over the image processing apparatus 20, the authentication information receiver 301 requests the apparatus ID from the image processing apparatus 20 and acquires the apparatus ID transmitted in response. The authentication information transmitter 302 transmits to the authentication apparatus 10 the acquired apparatus ID in addition to the user authentication information.

Upon authenticating the user in accordance with the received authentication information, the authentication processor 101 references the usage amount stored in association with the apparatus ID received together with the authentication information. The authentication processor 101 transmits to the user terminal 30 the permission information indicating the usage condition specifying the restriction range responsive to the usage amount of each of the referenced image processing apparatuses 20. The authentication processor 101 uses the range table indicating the relationship between the usage amount and the restriction range.

FIG. 13 illustrates another example of the range table. Referring to FIG. 13, the usage ranges "Less than Th1", "Th1 or more and less than Th2", and "More than Th2" are respectively associated with restriction ranges "Functions 1, 2, 3", "Functions 1 and 2", and "Function 1". As illustrated in FIG. 13, the authentication processor 101 transmits to an image processing apparatus 20 having a larger usage amount the permission information having the usage condition specifying a narrower available range.

In this way, an image processing apparatus 20 having a smaller usage amount is set to be more easily used such that load is distributed among the image processing apparatuses 20. The authentication processor 101 may transmit to an image processing apparatus 20 having a larger usage amount the permission information having the usage condition specifying a wider available range. In such a case, an image processing apparatus 20 having a larger usage amount may be used more often. In either case, the usage amount of each image processing apparatus 20 is adjusted.

Usage Criteria

The use-related operation may not be performed by the image processing apparatus 20 if a specific criteria is not satisfied. For example, if the use-related operation is printing in a color mode, the use-related operation is not performed without a certain amount of color toner remaining in the image processing apparatus 20. If the use-related operation is printing with a manual insert tray used, the use-related operation is not performed without the manual insert tray on the image processing apparatus 20.

In accordance with the modification, if a criteria (hereinafter referred to as a "process criteria") related to the use-related operation is not satisfied, another image processing apparatus 20 is recommended to the user. FIG. 14 is a functional block diagram of the modification. Referring to FIG. 14, an image processing apparatus 20b includes, in addition to the elements in FIG. 5, an apparatus information acquisition unit 203 and recommendation information output unit 204.

In accordance with the modification, the permission determination unit 201 determines whether the image processing apparatus 20 satisfies the process criteria that is determined for the use-related operation under the usage condition indicated by the permission information transmitted from the user terminal 30. In the determination of the process criteria, the permission determination unit 201 uses a process criteria table that associates the usage condition with the process criteria.

FIG. 15 illustrates an example of the process criteria table. Referring to FIG. 15, usage conditions "color mode", "printing for special paper", "document digitization" are respectively associated with process criteria "remaining amount of color toner being equal to or above reference value", "manual insert tray installed", and "OCR program installed". The permission determination unit 201 enquires the apparatus information acquisition unit 203 of the process criteria associated with the usage condition indicated by the permission information.

The apparatus information acquisition unit 203 acquires information on the process criteria of the image processing apparatus 20. For example, if the apparatus information acquisition unit 203 receives an enquiry about the process criteria of "remaining amount of color toner being equal to or above reference value", the apparatus information acquisition unit 203 acquires the remaining amount of toner of the image processing apparatus 20. If the apparatus information acquisition unit 203 receives an enquiry about the process criteria of "manual insert tray installed" or "OCR program installed", the apparatus information acquisition unit 203 acquires the hardware configuration or software configuration of the image processing apparatus 20.

Based on the remaining amount of toner, hardware configuration, or software configuration obtained in response to the respective enquiry, the permission determination unit 201 determines whether the image processing apparatus 20 satisfies the process criteria thereof. If the process criteria is determined to be satisfied, the permission determination unit 201 operates in the same manner as described with reference to the exemplary embodiment. If the process criteria is determined to be not satisfied, the permission determination unit 201 transfers the permission information used in the determination to the recommendation information output unit 204.

When the image processing apparatus 20 is determined not to satisfy the process criteria and the permission information is transferred, the recommendation information output unit 204 outputs recommendation information recommending the use of another image processing apparatus 20 indicated by the permission information. The recommendation information indicates the name or installation location of the recommended image processing apparatus 20. The recommendation information output unit 204 outputs the recommendation information to the display of the image processing apparatus 20.

FIG. 16 illustrates an example of the output recommendation information. Referring to FIG. 16, the image processing apparatus 20 displays a character string reading "This apparatus is not available under condition of user A", a button B21 indicating "XX section", and a button B22 indicating "YY section". The "XX section" and "YY section" indicate installation locations of the recommended image processing apparatuses 20 (meaning the room or floor of the corresponding sections).

The recommendation information may include detailed information on the recommended image processing apparatus 20. For example, the recommendation information may include a map or route guidance indicating the installation location of the recommended image processing apparatus 20. In such a case, the pressing of the button B21 or B22 may trigger the displaying of the remaining information included in the recommendation information. Another image processing apparatus 20 indicated by the permission information is an apparatus that the authenticated user is permitted to use.

The user may use the image processing apparatus 20 indicated by the displayed recommendation information instead of the authenticated image processing apparatus 20. The usage condition may fail to satisfy the process criteria. In such a case, the user may still use the authenticated image processing apparatus 20 if the image processing apparatus 20 is not used under that usage condition. If the image processing apparatus 20 is to be used under the usage condition that fails to satisfy the process criteria, switching to the use under the usage condition is more quickly performed than when the recommendation information is not output.

One of the other image processing apparatuses 20 may fail to satisfy the process criteria. In such a case, the recommendation information output unit 204 may output the recommendation information that recommends using an image processing apparatus 20 satisfying the process criteria from among the other image processing apparatuses 20. In order to output the recommendation information, the apparatus information acquisition unit 203 acquires information on the process criteria of not only the image processing apparatus 20 but the other image processing apparatuses 20.

If it is determined that the image processing apparatus 20 fails to satisfy the process criteria, the permission determination unit 201 transfers to the recommendation information output unit 204 not only the permission information used in the determination but also information on the acquired process criteria of the other image processing apparatuses 20. If the transferred information indicates another image processing apparatus 20 that satisfies the process criteria, the recommendation information output unit 204 outputs the recommendation information recommending the use of that other image processing apparatus 20. The modification controls the status under which the recommended image processing apparatus 20 is unavailable under the usage condition.

Adjacent Apparatuses

The availability of the image processing apparatus 20 for each user is determined from the viewpoint of costs. The availability of the image processing apparatus 20 for each user may be determined from another viewpoint. FIG. 17 illustrates the hardware configuration of the modification. Referring to FIG. 17, a user terminal 30c includes a sensor device 36 in addition to the elements in FIG. 4.

The sensor device 36 includes a sensor fixing the position of the user terminal 30c (such as a global positioning system (GPS)). The sensor device 36 transfers to the processor 31 the position information (latitude and longitude) indicating the position fix of the user terminal 30c. In accordance with the modification, the user may stand in front of the image processing apparatus 20 and input the authentication information to the user terminal 30c. If the authentication information transmitter 302 in the user terminal 30c receives the authentication information from the authentication information receiver 301, the authentication information transmitter 302 causes the sensor device 36 to fix the position of the user terminal 30c.

The authentication information transmitter 302 transmits to the authentication apparatus 10 the position information of the user terminal 30 fixed by the sensor device 36 together with the user authentication information received. If the installation location of the image processing apparatus 20 is near an area outside a building, like in a convenience store, an error in position may be smaller. If the installation location of the image processing apparatus 20 is in a larger office within a building, GPS radio waves may be difficult to reach and a position fixing error through the GPS system may be larger.

In such a case, the user terminal 30c may fix the position thereof using position fixing techniques, such as WiFi measurement, radio frequency identifier (RFID), or beacon measurement. The authentication processor 101 in the authentication apparatus 10 identifies an image processing apparatus 20 located within a predetermined range of distance from the position indicated by the position information. For example, the authentication processor 101 stores the position information of all the image processing apparatuses 20 included in the authentication assisting system 1 and determines whether each image processing apparatus 20 is located within the range determined from calculating the distance to the position of the user terminal 30c.

The distance between the position of the user terminal 30c and the image processing apparatus 20 may be calculated in direct distance or along the path the user may take. If the distance is calculated along the path, the authentication processor 101 may store map information near the installation location of the image processing apparatus 20 (including the path inside the building). The authentication processor 101 transmits to the user terminal 30 the permission information related to two or more image processing apparatuses 20 that the user is permitted to use and that include the image processing apparatus 20 identified described above.

The authentication processor 101 may include, in the permission information, information that indicates the identified image processing apparatus 20. The authentication processor 101 may or may not further include, in the permission information, information that indicates the image processing apparatus 20 that is determined to be available by the availability information in the exemplary embodiment. In either case, the permission information indicates the image processing apparatus 20 that is located within the range of the predetermined distance from the user terminal 30c. The image processing apparatuses 20 include the nearby image processing apparatus 20 that is currently used by the user.

The user may not necessarily enter the authentication information at a location near the image processing apparatus 20. For example, the user may input the authentication information at the user's own disk possibly apart from the image processing apparatus 20 in the office. In such a case as well, the image processing apparatus 20 locating with the range of the predetermined distance from the user terminal 30c may be available. The user may determine the timing at which the user terminal 30c fixes the position thereof.

The user terminal 30c may display a position fixing button on the login screen of an authentication application (app) and may fix position when the position fixing button is pressed. In either case, once the authentication information is input on one of the two or more image processing apparatuses 20 located within the range of the predetermined distance from the user terminal 30c, the user is later free from entering the authentication information.

Validity Period of Permission Information

A validity period may be set in the permission information indicating two or more image processing apparatuses 20 that the user is permitted to use. The permission information memory 306 stores the permission information indicating the image processing apparatuses 20 that the authenticated user is permitted to use and continues to store the permission information until the expiration of the predetermined validity period.

The administrator, operator or user of the authentication assisting system 1 determines and registers the validity period of the permission information on the authentication apparatus 10. The validity period of the permission information is stored on the authentication information memory 102. FIG. 18 illustrates an example of the validity period. Referring to FIG. 18, the authentication information memory 102 stores on a per user basis the authentication information, availability information, and validity period (1 week for the user A, 2 weeks for the user B, and 3 days for the user C).

In accordance with the modification, the authentication processor 101 generates the authentication result data including the authentication information, permission information, and validity period and then transmits the authentication result data to the user terminal 30. The permission information memory 306 stores in an associated form the permission information and the validity period indicated by the authentication result data. When the predetermined validity period of the permission information has expired, the permission information memory 306 performs the operation described below.

In a user company, the model of the image processing apparatus 20 available to an employee of the company as a user may be periodically changed. This change is reflected on the authentication apparatus 10 and the availability information (information indicating the availability of each image processing apparatus 20) stored on the authentication information memory 102 in the authentication apparatus 10 is updated as well. The permission information memory 306 thus stores the permission information. When the validity period of the permission information has expired, the permission information memory 306 retrieves from the authentication apparatus 10 new permission information on a user permitted to use the image processing apparatus 20 indicated by the permission information and then stores the new permission information.

The authentication processor 101 in the authentication apparatus 10 transmits, as the authentication result data, the permission information and data indicating user ID of the authenticated user. The permission information memory 306 stores in an associated form the user ID and the permission information indicated by the authentication result data. When the validity period has expired, the permission information memory 306 transmits to the authentication apparatus 10 request data requesting the permission information of the user having the stored user ID.

The authentication processor 101 transmits to the user terminal 30 the latest permission information indicated by the availability information stored for the user having the requested user ID. The permission information memory 306 stores the latest permission information received. In this case, the permission information memory 306 may overwrite the currently stored information with the latest permission information or may store in a memory region the latest permission information in association with the date of acquisition.

If the latest permission information is stored in association with the date of acquisition, the permission information memory 306 reuses the permission information having the latest date of acquisition. In such a case, for example, the authentication information memory 102 may simply store the validity period, such as "period until July 14", rather than 1 week in FIG. 18. In either case, if the validity period has expired, the latest permission information is stored. The image processing apparatus 20 that is originally unavailable is less likely used in accordance with the permission information prior to the update than when the latest permission information is not stored.

When the predetermined validity period of the permission information has expired since the storage of the permission information, the permission information memory 306 may delete the permission information. If the user terminal 30 storing the permission information is used, the image processing apparatus 20 may possibly be used by a third party having no knowledge of the authentication information. With the permission information deleted after the expiration of the validity period, the unauthorized use by a third party may be more controlled than when the permission information is not deleted.

If the validity period of the permission information has expired since the storage of the permission information, the permission information memory 306 does not unconditionally delete the permission information. The permission information memory 306 may delete the permission information if a transmission log of the permission information satisfies a delete condition. In order to reuse the permission information in accordance with the exemplary embodiment, the permission information transmitter 304 reads the permission information from the permission information memory 306 and transmits the read permission information to the image processing apparatus 20.

The transmission log of the permission information is a log of the transmission of the permission information to the user terminal 30 when the permission information is used. The delete condition may be satisfied if a duration throughout which the stored permission information is not transmitted exceeds a constant period of time. Since the delete condition is satisfied if the constant period of time has elapsed, the authenticated user may possibly use the image processing apparatus 20 less frequently.

The permission information is deleted because the control of unauthorized use of the image processing apparatus 20 is prioritized over user convenience. The delete condition may be satisfied if the number or frequency of transmissions of the stored permission information is less than a threshold value. In this case, as well, the permission information is deleted for a user less frequently using the image processing apparatus 20 because the control of unauthorized use of the image processing apparatus 20 is prioritized over user convenience.

Conversely, the delete condition may be satisfied if the number or frequency of transmissions of the stored permission information is equal to or above the threshold value. A user using the image processing apparatus 20 more frequently may more likely satisfy the delete condition and time to specify the authentication information may increase. In either delete condition, the user convenience is better balanced with the control of unauthorized use than when the permission information is not deleted based on the delete condition.

Variations of Validity Period

The validity period of the permission information may be varied. As described with reference to the exemplary embodiment, when the permission information is reused, the permission information transmitter 304 reads the permission information from the permission information memory 306 and transmits the read permission information to the image processing apparatus 20. In accordance with the modification, the validity period is set to be a time length responsive to an amount of transmission of the permission information from the permission information memory 306 to the image processing apparatus 20.

The amount of transmission of the permission information is represented by the number or frequency of transmissions, or an amount of data of the permission information. The permission information memory 306 calculates the amount of transmission each time the permission information is read from the permission information transmitter 304. As described above, the permission information memory 306 sets the validity period described above to be a reference validity period and varies the validity period by multiplying the reference validity period by a coefficient responsive to the calculated amount of transmission.

The permission information memory 306 stores a coefficient table that associates the amount of transmission with the validity period. FIG. 19 illustrates an example of the coefficient table. Referring to FIG. 19, the amounts of transmission "Less than Th11", "Th11 or more and less than Th12", and "Th12 or more" are respectively associated with coefficients "1.0 times", "1.5 times", and "2.0 times".

When the reference validity period has expired, the permission information memory 306 references a coefficient associated with the amount of transmission calculated during the validity period in the coefficient table. If the amount of transmission is "Less than Th11", the coefficient is "1.0" times, and the permission information memory 306 uses the reference validity period as is and determines that the validity period has expired. On the other hand, the amounts of transmission "Th11 or more and less than Th12" and "Th12 or more" are respectively associated with "1.5 times" and "2.0 times" and the permission information memory 306 determines that the validity period is set to be longer than the reference validity period.

The reference validity period may now be multiplied by 1.5. If the validity period that is 1.5 times the reference validity period has expired, the permission information memory 306 references again the coefficient associated with the amount of transmission calculated heretofore in the coefficient table. If the referenced coefficient is still 1.5 times, the permission information memory 306 determines that the validity period has expired. If the referenced coefficient is 2.0 times, the permission information memory 306 determines that the validity period has been extended. The reference validity period may now be multiplied by 2.0. If the validity period that is 2.0 times the reference validity period has elapsed, the permission information memory 306 determines that the validity period has expired.

The setting of the validity period is not limited to the above-described method. For example, specifying the authentication information and the elapse of the validity period are repeated by several times. The permission information memory 306 may use, as a coefficient by which a current reference validity period is multiplied, the coefficient associated with the amount of transmission calculated until the elapse of the preceding validity period. Referring to FIG. 19, user convenience is increased by setting the validity period to be longer for a user reusing the permission information more frequently. The reuse of the permission information is thus promoted more than when the validity period is constant.

In contrast to the example in FIG. 19, user convenience may be increased by setting the validity period to be longer for a user reusing the permission information less frequently. The opportunities for each user to reuse the permission information are more equalized than when the validity period remains unchanged. In accordance with the modification, in either case, the frequency of opportunities to reuse the permission information is adjusted more than when the validity period remains unchanged.

First Apparatus

The user terminal 30 (an example of a "first apparatus" of the disclosure) receiving the authentication information in the authentication assisting system 1 may be a smart phone. The user terminal 30 may also be a tablet terminal, notebook personal computer (PC), or wearable terminal. The first apparatus transmits the permission information to the image processing apparatus 20 when a user uses the image processing apparatus 20 as an example of a second apparatus. The first apparatus is thus desirably portable to an area close to the image processing apparatus 20.

Second Apparatus

The second apparatus of the disclosure used by a user in the authentication assisting system 1 is not limited to the image processing apparatus 20. The second apparatus may be a shared personal computer (PC) or a kiosk terminal. The second apparatus may be a car shared among users. In each case, it is sufficient if the authentication assisting system 1 includes multiple image processing apparatuses 20.

The use-related operation may be different depending on the type of the second apparatus. For example, if the second apparatus is a PC, an operation to start up a specific application program is performed as the use-related operation. If the second apparatus is a kiosk terminal, the use-related operations may include an operation to display specific menu and an operation to receive an operation performed on the specific menu. If the second apparatus is a car, the use-related operations may include an operation to lock or unlock the door lock of the car and an operation to start up the engine. In each case, it is sufficient if the second apparatus is used by an authenticated user and has the same functions as those of the image processing apparatus 20.

Functional Configuration

The functional configuration of the authentication assisting system 1 is not limited to the functional configuration in FIG. 5. For example, in accordance with the exemplary embodiment, the authentication processor 101 in the authentication apparatus 10 performs the operation to authenticate each user and the operation to transmit the permission information to the user terminal 30. These operations may be performed by separate functions.

A single function managing the permission information may be responsible for the operations of the permission information transmitter 304 and the permission information memory 306 in the user terminal 30. The functions of the authentication apparatus 10 may be implemented by two or more image processing apparatuses 20 or a computer resource provided by cloud service. As long as the functions in FIG. 5 are implemented by the authentication assisting system 1 as a whole, the range of operations performed by each function and an apparatus implementing the function are freely configured.

Processor

In the exemplary embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

Category of Disclosure

The present disclosure may be construed as an information processing apparatus, such as the authentication apparatus, image processing apparatus, or user terminal. The present disclosure may also be constructed as an information processing system (such as the authentication assisting system 1) including an information processing apparatus. The present disclosure may also be construed as an information processing method that implements the process of each information processing apparatus or as a computer program to cause a computer to function to control each information processing apparatus. The computer program may be provided in a recorded form on a recording medium, such as an optical disk. The computer program may also be downloaded to a computer via a communication network, such as the Internet, and then installed onto the computer in an available form.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a first apparatus;
a plurality of second apparatuses; and
a server,
wherein the first apparatus receives authentication information from a user and transmits the authentication information to the server,
wherein when the user has been authenticated in accordance with the authentication information, the server transmits, to the first apparatus, permission information that indicates two or more second apparatuses that the user is permitted to use from among the second apparatuses,
wherein the first apparatus stores the authentication information while transmitting the authentication information to the second apparatuses,
wherein when the authentication information indicates one of the second apparatuses, the one of the second apparatuses performs an operation related to use of the one of the second apparatuses,
wherein the server transmits, as the authentication information, information indicating a condition that is applied when the two or more second apparatuses available for use are used, and
wherein one of the second apparatuses available for use performs an operation related to use of the one of the second apparatuses under the condition indicated by the transmitted permission information.

2. The information processing system according to claim 1, wherein the server transmits, as the authentication information, information indicating the condition that is different depending on the authenticated user.

3. The information processing system according to claim 2, wherein the condition specifies a restriction range of use by each user, and
wherein the server acquires a usage amount of the second apparatuses by an authenticated user and transmits the permission information indicating a condition specifying the restriction range having a width responsive to the usage amount.

4. The information processing system according to claim 3, wherein the condition specifies a restriction range of use per each of the second apparatuses, and wherein the server acquires a usage amount of each of the two or more second apparatuses and transmits the permission information indicating the condition specifying the restriction range having a width responsive to the usage amount.

5. The information processing system according to claim 4, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

6. The information processing system according to claim 3, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

7. The information processing system according to claim 6, wherein the one of the second apparatuses outputs the recommendation information that recommends using a second apparatus that satisfies the criteria from among the second apparatuses.

8. The information processing system according to claim 2, wherein the condition specifies a restriction range of use per each of the second apparatuses, and
wherein the server acquires a usage amount of each of the two or more second apparatuses and transmits the permission information indicating the condition specifying the restriction range having a width responsive to the usage amount.

9. The information processing system according to claim 8, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

10. The information processing system according to claim 2, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

11. The information processing system according to claim 10, wherein the one of the second apparatuses outputs the recommendation information that recommends using a second apparatus that satisfies the criteria from among the second apparatuses.

12. The information processing system according to claim 1, wherein the condition specifies a restriction range of use per each of the second apparatuses, and
wherein the server acquires a usage amount of each of the two or more second apparatuses and transmits the permission information indicating the condition specifying the restriction range having a width responsive to the usage amount.

13. The information processing system according to claim 12, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

14. The information processing system according to claim 1, wherein when the one of the second apparatuses fails to satisfy criteria determined for an operation related to the use under the condition indicated by the transmitted permission information, the one of the second apparatuses outputs recommendation information recommending using another second apparatus indicated by the permission information.

15. The information processing system according to claim 14, wherein the one of the second apparatuses outputs the recommendation information that recommends using a second apparatus that satisfies the criteria from among the second apparatuses.

16. The information processing system according to claim 1, wherein the first apparatus stores the permission information and when a validity period of the permission information has expired, the first apparatus acquires, from the server, new permission information about a user who has been permitted to use the second apparatus indicated by the permission information and stores the new permission information.

17. The information processing system according to claim 16, wherein the first apparatus deletes the permission information when a transmission log of the permission information satisfies a delete condition and the validity period has expired.

18. An information processing system comprising:
a first apparatus;
a plurality of second apparatuses; and
a server,
wherein the first apparatus receives authentication information from a user and transmits the authentication information to the server,
wherein when the user has been authenticated in accordance with the authentication information, the server transmits, to the first apparatus, permission information that indicates two or more second apparatuses that the user is permitted to use from among the second apparatuses,
wherein the first apparatus stores the authentication information while transmitting the authentication information to the second apparatuses,
wherein when the authentication information indicates one of the second apparatuses, the one of the second apparatuses performs an operation related to use of the one of the second apparatuses,
wherein the first apparatus transmits, to the server, position information indicating a position of the first apparatus together with the authentication information, and
wherein the server transmits the permission information that indicates another second apparatus included in the two or more second apparatuses when a distance between the other second apparatus and the position of the first apparatus indicated by the transmitted position information falls within a predetermined range.

19. An information processing system comprising:
a first apparatus;
a plurality of second apparatuses; and
a server,
wherein the first apparatus receives authentication information from a user and transmits the authentication information to the server,
wherein when the user has been authenticated in accordance with the authentication information, the server transmits, to the first apparatus, permission information that indicates two or more second apparatuses that the user is permitted to use from among the second apparatuses, wherein the first apparatus stores the authentication information while transmitting the authentication information to the second apparatuses, wherein when the authentication information indicates one of the second apparatuses, the one of the second apparatuses performs an operation related to use of the one of the second apparatuses, wherein the first apparatus stores the permission information and when a validity period of the permission information has expired, the first apparatus acquires, from the server, new permission information about a user who has been permitted to use the second apparatus indicated by the permission information and stores the new permission information, and wherein the first apparatus sets, to be the validity period, a time length responsive to an amount of transmission of the permission information to the second apparatus.

* * * * *